United States Patent Office 2,829,056
Patented Apr. 1, 1958

2,829,056
DIETARY SEASONING COMPOSITION

Kenneth S. Kemmerer, Evansville, Ind., assignor to Mead Johnson & Company, a corporation of Indiana No Drawing. Application January 24, 1956
Serial No. 561,155

13 Claims. (Cl. 99—143)

This invention relates to a dietary seasoning composition.

This application is a continuation-in-part of my copending application Serial No. 448,389, filed August 6, 1954, and now abandoned.

The composition of this invention is primarily useful as a food seasoning salt substitute to be used in those instances where sodium in the diet must be avoided. The composition of this invention has a salty taste resembling that of ordinary table salt, is not bitter, does not leave a disagreeable aftertaste, can be used in cooking without change in the composition and is substantially free of sodium ions.

One of the features of this invention is to provide a dietary seasoning composition comprising by weight about 5.7–17% of a member of the class consisting of a lysine dihydrochloride, a histidine dihydrochloride and an ornithine dihydrochloride; about 13.6–40.7% of a member of the class consisting of monopotassium glutamate and monoammonium glutamate; and about 76.7–38.3% of potassium chloride.

Other features of the invention will be apparent from the following description of the invention and certain embodiments thereof.

Many dietary seasoning compositions have been proposed in the past for use for those individuals who cannot tolerate table salt because of the sodium ions present. These compositions have often been sufficiently salty but in many instances were found to be either bitter or to leave a disagreeable aftertaste in the mouth. Furthermore, certain of these compositions could not be used in cooking because of chemical change brought about by the heat or other cooking conditions, and thus for one or a number of reasons were unsatisfactory. The composition of this invention overcomes these difficulties and acts almost entirely like ordinary table salt in seasoning ability and has the advantage of being sodium-free.

The composition of this invention comprises:

|  | Percent |
|---|---|
| Lysine dihydrochloride or histidine dihydrochloride or ornithine dihydrochloride | 5.7–17 |
| Monopotassium glutamate or monoammonium glutamate | 14.6–40.7 |
| Potassium chloride | 76.7–38.3 |

In the preferred composition, there is also included an excipient to assure a free-flowing composition and this excipient may be tricalcium phosphate present in relatively small amounts, such as about 4%.

The lysine dihydrochloride, histidine dihydrochloride, or ornithine dihydrochloride may be either the L-form, the D-form, or the DL-form.

The potassium chloride in the composition of this invention is the principal supplier of the salty taste. Its concentration in the composition is maintained sufficiently low by dilution with the other ingredients so that any bitter taste from the potassium chloride is minimized to the point where it is scarcely detectable and in most instances is not detectable at all. The two types of diluents, the dihydrochloride and the glutamate, do more than merely dilute, however, as they also contribute to the taste of the composition. Thus, the glutamate appears to act as an organic source of potassium or ammonium while the dihydrochlorides appear to act as organic sources of chloride ions. These compounds, therefore, apparently contribute potassium or ammonium chloride itself for a portion of the salt taste and the organic radical, the glutamate and lysine, histidine, and ornithine do not detract from the saltiness of the entire composition. Actually, the glutamate ion probably enhances the salt flavor of the composition.

The lysine dihydrochloride, histidine dihydrochloride, and ornithine dihydrochloride, which serve as organic carriers for chloride ions, and the monopotassium and monoammonium glutamate, which serve as organic carriers supplying potassium or ammonium, are used in such amounts that the chloride ions from the dihydrochloride approximately balances the potassium and ammonium ions from the glutamate. Probably both of the chloride ions from the dihydrochloride molecule are available to counterbalance the potassium or ammonium ion derived from the glutamate. As lysine, histidine, and ornithine are each practically tasteless, they contribute no foreign flavor to the composition of this invention. Furthermore, lysine, histidine, and ornithine are each an important additive to the food as they are natural food components being amino acids present in all protein and thus natural to the body. It is because of the presence of the potassium or ammonium and chloride ions and their availability from the organic compounds that apparently permits the potassium chloride ingredient to be diluted below the bitter tasting level without sacrifice of an overall salty taste.

The potassium or ammonium from the glutamate and the chloride ion from the lysine dihydrochloride, histidine dihydrochloride, and ornithine dihydrochloride are gradually released in the presence of water, such as in the mouth, so that the concentration of these two ions never reaches a point where a bitter taste is experienced, yet because of the presence of the potassium chloride in the dry composition, a salty taste is experienced from the beginning without the usual accompanying bitterness.

Example 1

In one embodiment of this invention a composition having the following formula was produced:

|  | Percent |
|---|---|
| DL-lysine dihydrochloride | 14.1 |
| Monopotassium glutamate | 33.9 |
| Potassium chloride | 48.0 |
| Tricalcium phosphate | 4.0 |

In preparing the composition the ingredients were thoroughly mixed in the above proportions, wetted and granulated through a screen to provide a substantially uniform particle size and then dried. The material was then ready for packaging and use. As has been pointed out above, the tricalcium phosphate is present as an excipient to assure a free-flowing composition.

Example 2

In a second embodiment a similar procedure was followed to produce a composition having the following formula:

|  | Percent |
|---|---|
| L-histidine dihydrochloride | 14.7 |
| Potassium glutamate | 33.8 |
| Potassium chloride | 47.9 |
| Tricalcium phosphate | 3.6 |

Example 3

Another composition was produced in the manner set forth above in Example 1 having the following composition:

| | Percent |
|---|---|
| L-ornithine dihydrochloride | 13.4 |
| Potassium glutamate | 34.4 |
| Potassium chloride | 48.6 |
| Tricalcium phosphate | 3.6 |

Example 4

Still another formula was prepared following the procedure set out above in Example 1, but having the following formula:

| | Percent |
|---|---|
| DL-lysine dihydrochloride | 14.7 |
| Ammonium glutamate | 31.3 |
| Potassium chloride | 49.9 |
| Tricalcium phosphate | 4.1 |

The presence of monoammonium glutamate in those embodiments of the invention wherein this compound is used instead of monopotassium glutamate serves to further reduce the potassium content of the composition.

Having described my invention as related to the embodiments set out herein, it is my intention that the invention be not limited by any of the details of description unless otherwise specified, but rather be construed broadly within its spirit and scope as set out in the accompanying claims.

I claim:

1. A dietary seasoning composition, comprising, by weight, about 5.7–17% of a member of the class consisting of a lysine dihydrochloride, a histidine dihydrochloride, and an ornithine dihydrochloride; about 13.6–40.7% of a member of the class consisting of monopotassium glutamate and monoammonium glutamate; and about 76.7–38.3% of potassium chloride.

2. A dietary seasoning composition, comprising, by weight, about 5.7–17% of a lysine dihydrochloride; about 13.6–40.7% of a member of the class consisting of monopotassium glutamate and monoammonium glutamate; and about 76.7–38.3% of potassium chloride.

3. A dietary seasoning composition, comprising, by weight, about 5.7–17% of a histidine dihydrochloride; about 13.6–40.7% of a member of the class consisting of monopotassium glutamate and monoammonium glutamate; and about 76.7–38.3% of potassium chloride.

4. A dietary seasoning composition, comprising, by weight, about 5.7–17% of an ornithine dihydrochloride; about 13.6–40.7% of a member of the class consisting of monopotassium glutamate and monoammonium glutamate; and about 76.7–38.3% of potassium chloride.

5. A dietary seasoning composition, comprising, by weight, about 5.7–17% of a member of the class consisting of a lysine dihydrochloride, a histidine dihydrochloride, and an ornithine dihydrochloride; about 13.6–40.7% of monopotassium glutamate; and about 76.7–38.3% of potassium chloride.

6. A dietary seasoning composition, comprising, by weight, about 5.7–17% of a member of the class consisting of a lysine dihydrochloride, a histidine dihydrochloride, and an ornithine dihydrochloride; about 13.6–40.7% of monoammonium glutamate; and about 76.7–38.3% of potassium chloride.

7. A dietary seasoning composition, comprising by weight, about 5.7–17% of DL-lysine dihydrochloride; about 13.6–40.7% of a member of the class consisting of monopotassium glutamate and monoammonium glutamate; and about 76.7–38.3% of potassium chloride.

8. A dietary seasoning composition, comprising, by weight, about 5.7–17% of L-histidine dihydrochloride; about 13.6–40.7% of a member of the class consisting of monopotassium glutamate and monoammonium glutamate; and about 76.7–38.3% of potassium chloride.

9. A dietary seasoning composition, comprising, by weight, about 5.7–17% of L-ornithine dihydrochloride; about 13.6–40.7% of a member of the class consisting of monopotassium glutamate and monoammonium glutamate; and about 76.7–38.3% of potassium chloride.

10. A dietary seasoning composition, comprising, by weight, about 5.7–17% of a lysine dihydrochloride, about 13.6–40.7% of monopotassium glutamate, and about 76.7–38.3% of potassium chloride.

11. A dietary seasoning composition, comprising, by weight, about 5.7–17% of DL-lysine dihydrochloride, about 13.6–40.7% of monopotassium glutamate, and about 76.7–38.3% of potassium chloride.

12. A dietary seasoning composition, comprising, by weight, about 14.1% of a lysine dihydrochloride, about 33.9% of monopotassium glutamate, and about 48.0% of potassium chloride.

13. A dietary seasoning composition, comprising, by weight, about 14.1% of DL-lysine dihydrochloride, about 33.9% of monopotassium glutamate, and about 48.0% of potassium chloride.

References Cited in the file of this patent

UNITED STATES PATENTS

| | | |
|---|---|---|
| 1,874,055 | Liebracht | Aug. 30, 1932 |
| 2,414,299 | Hall | Jan. 14, 1947 |
| 2,500,919 | Cahn | Mar. 21, 1950 |
| 2,596,333 | Halpern et al. | May 13, 1952 |
| 2,601,112 | Freedman | June 17, 1952 |